United States Patent
Mariaskin et al.

(10) Patent No.: US 10,714,079 B2
(45) Date of Patent: Jul. 14, 2020

(54) METHODS AND SYSTEM FOR ANALYZING CONVERSATIONAL STATEMENTS AND PROVIDING FEEDBACK IN REAL-TIME

(71) Applicant: MOTOROLA SOLUTIONS, INC., Chicago, IL (US)

(72) Inventors: Evgenii Leonidovich Mariaskin, Saint-Petersburg (RU); Valeriia Antonovna Generalova, Saint-Petersburg (RU)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 102 days.

(21) Appl. No.: 15/777,854

(22) PCT Filed: Dec. 23, 2015

(86) PCT No.: PCT/RU2015/000919
§ 371 (c)(1),
(2) Date: May 21, 2018

(87) PCT Pub. No.: WO2017/111646
PCT Pub. Date: Jun. 29, 2017

(65) Prior Publication Data
US 2018/0350354 A1 Dec. 6, 2018

(51) Int. Cl.
*G10L 15/00* (2013.01)
*G10L 15/19* (2013.01)
(Continued)

(52) U.S. Cl.
CPC ............ *G10L 15/19* (2013.01); *G06F 16/00* (2019.01); *G06F 16/3329* (2019.01);
(Continued)

(58) Field of Classification Search
USPC ................. 704/231–257, 270–275
See application file for complete search history.

(56) References Cited

U.S. PATENT DOCUMENTS 7,739,102 B2 * 6/2010 Bender ............... G06F 17/2785
704/9
8,086,557 B2 12/2011 Ait-Mokhtar et al.
(Continued)

FOREIGN PATENT DOCUMENTS

WO 2006/042028 4/2006
WO 2007/008042 1/2007

OTHER PUBLICATIONS

PCT/RU2015/000919 International Search Report and Written Opinion of the International Searching Authority dated Sep. 28, 2016 (16 pages).
(Continued)

*Primary Examiner* — Jesse S Pullias
(74) *Attorney, Agent, or Firm* — Michael Best & Friedrich LLP (57) ABSTRACT

A method and apparatus are provided for analyzing conversational statements and providing feedback in real-time. Audio stream data is recorded by a communication device and converted into a logical analysis format representation. Logical analysis is performed automatically on the logical analysis format representation of the natural-language statement. The logical analysis identifies one or more candidate output resolutions and identifies supplemental data that can confirm the one or more candidate output resolutions. The identified supplemental data is accessed and the one or more candidate output resolutions are evaluated based at least in part on the supplemental data. A feedback message is generated and displayed on the mobile communication device. The feedback message is indicative of the evaluation of the one or more candidate output resolutions and may provide a recommended follow-up question to be asked by the user of the communication device in the current conversation.

18 Claims, 4 Drawing Sheets

(51) Int. Cl.
*G06F 16/332* (2019.01)
*G06N 5/04* (2006.01)
*G06F 16/00* (2019.01)
*G06F 40/289* (2020.01)
*G10L 15/22* (2006.01)

(52) U.S. Cl.
CPC ............ *G06F 40/289* (2020.01); *G06N 5/04* (2013.01); *G10L 2015/223* (2013.01); *G10L 2015/228* (2013.01)

(56) References Cited

U.S. PATENT DOCUMENTS

| | | | |
|---|---|---|---|
| 8,229,795 B1 | 7/2012 | Myslinski | |
| 8,712,759 B2 | 4/2014 | Ylonen | |
| 8,903,713 B2 | 12/2014 | Peterson | |
| 8,924,197 B2 | 12/2014 | Pragada et al. | |
| 8,943,371 B2 | 1/2015 | Russo et al. | |
| 8,990,234 B1* | 3/2015 | Myslinski | G06F 40/289 707/758 |
| 9,053,427 B1 | 6/2015 | Myslinski | |
| 9,092,521 B2 | 7/2015 | Myslinski | |
| 2005/0240393 A1* | 10/2005 | Glosson | G06F 17/24 704/8 |
| 2006/0247915 A1* | 11/2006 | Bradford | G06F 3/0481 704/1 |
| 2007/0076862 A1* | 4/2007 | Chatterjee | G06F 17/276 379/433.06 |
| 2011/0320548 A1* | 12/2011 | Jonsson | G06F 3/0237 709/206 |
| 2012/0245944 A1 | 9/2012 | Gruber et al. | |
| 2015/0261744 A1 | 9/2015 | Suenbuel et al. | |

OTHER PUBLICATIONS

Moss et al., "Applications of Modal Logic in Linguistics," Handbook of Modal Logic (2007) XP055302624, ISBN: 978-0-444-51690-9, pp. 1-49.

* cited by examiner

METHODS AND SYSTEM FOR ANALYZING CONVERSATIONAL STATEMENTS AND PROVIDING FEEDBACK IN REAL-TIME

BACKGROUND OF THE INVENTION

Initial witness interrogation at an incident scene is often not entirely effective. Police and other emergency responders in the field cannot fully analyze facts and ask important follow-up questions at the incident scene and, therefore, often must bring witnesses back for follow-up or repeated questioning.

Accordingly, there is a need for systems and methods that improve the reliability and completeness of in-the-field questioning.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

This disclosure provides methods and systems for analyzing conversational statements and providing feedback in real-time. Audio stream data is recorded by a communication device and converted into a logical analysis format representation. Logical analysis is performed automatically on the logical analysis format representation of the natural-language statement. The logical analysis identifies one or more candidate output resolutions and identifies supplemental data that can confirm the one or more candidate output resolutions. The identified supplemental data is accessed and the one or more candidate output resolutions are evaluated based at least in part on the supplemental data. A feedback message is generated and output by the communication device. The feedback message is indicative of the evaluation of the one or more possible output resolutions and may provide a recommended follow-up question to be asked by the user of the mobile communication device in the current conversation. In some implementations, the feedback message is output by displaying a text-based output message on a display of the communication device while, in other implementations, the feedback message is output as audio through the speaker of the communication device.

Some implementations described below provide systems and methods for detecting an inconsistent statement during a conversation. Audio stream data including a natural-language statement is captured by a communication device and received by a computer system. The natural-language statement is converted into a logical analysis format representation. One or more network-accessible data sources are automatically searched by the computer system based on the logical analysis format representation of the natural-language statement. An alert is generated on the communication device when the results of the automatic search are inconsistent with the natural-language statement.

Figure 1:
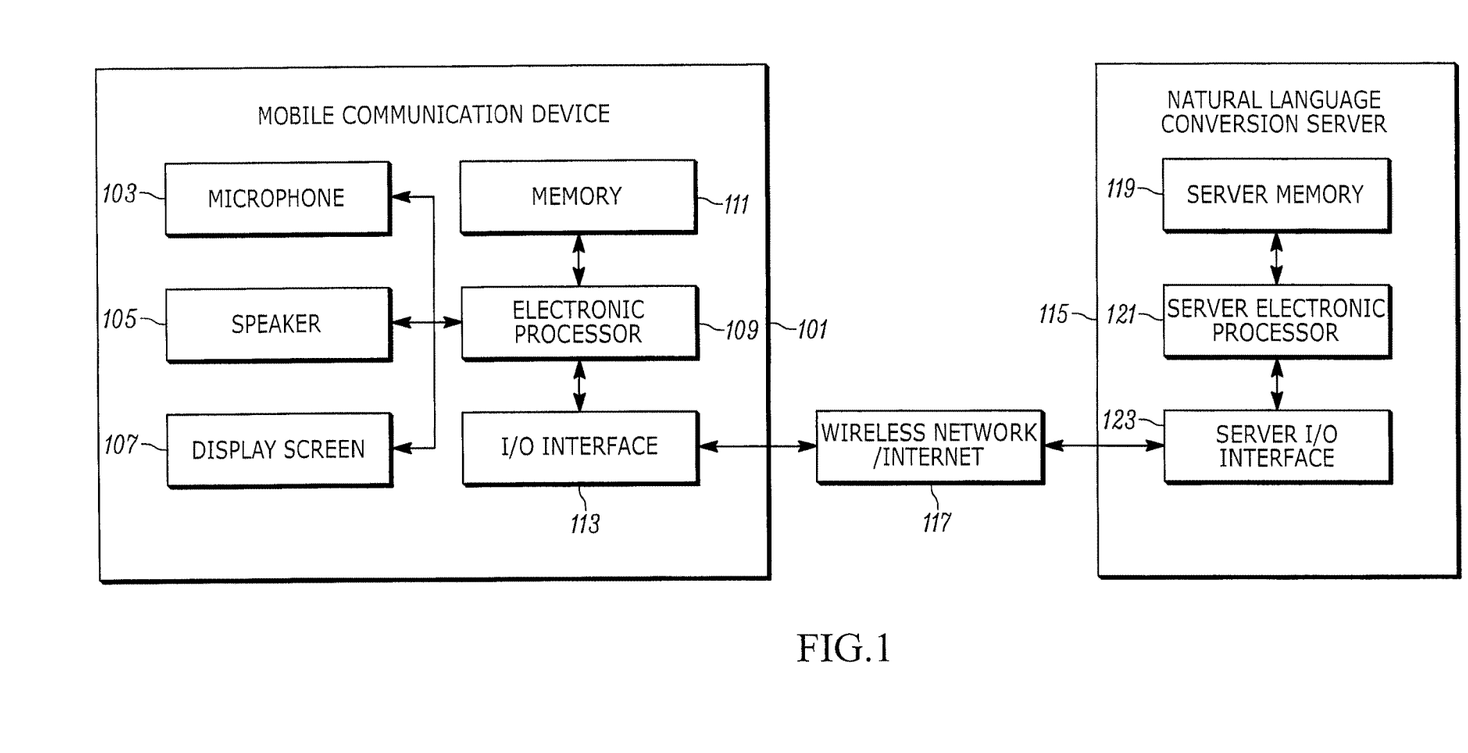
FIG. 1 is a block diagram of a communication network including a mobile communication device in accordance with some embodiments.

FIG. 1 is a block diagram of a mobile communications network. A mobile communication device 101 (for example, a portable land mobile radio or a smart telephone) includes user interface hardware such as a microphone 103, a speaker 105, and a display screen 107. An electronic processor 109 receives input audio data from the microphone 103, provides output audio data to the speaker 105, and provides output visual data to the display screen 107. The electronic processor 109 is communicatively coupled to a memory 111 that stores data and instructions that are executable by the electronic processor 109 to control the operation of the mobile communication device 101. The memory 111 includes one or more non-transitory computer-readable memory devices such as, for example, random access memory (RAM), read only memory (ROM), Flash memory, or optical/magnetic disk storage.

The mobile communication device 101 also includes an input/output (I/O) interface 113 capable of wirelessly communicating with other systems and devices. For example, the mobile communication device 101 is configured to communicate with a natural language conversion server 115 through a wireless network 117 (e.g., the Internet). The natural language conversion server 115 also includes one or more non-transitory computer-readable server memories 119 for storing data and instructions, a server electronic processor 121, and a server input/output (I/O) interface 123.

Figure 2:
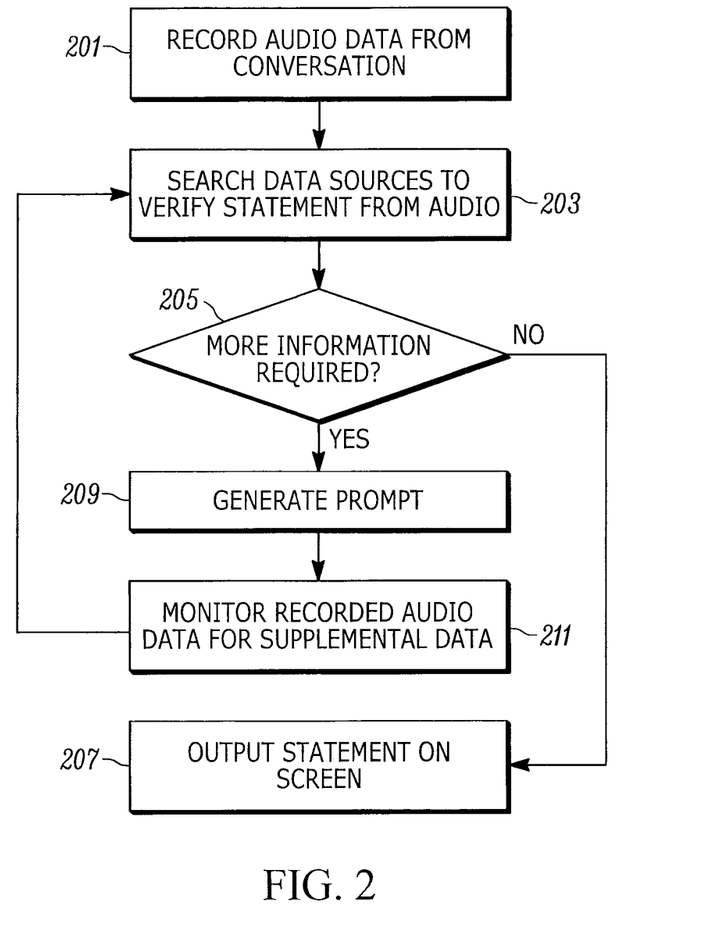
FIG. 2 is a flowchart of a method of performing automated real-time analysis of audio data to supplement questioning using the mobile communication device and communications network of FIG. 1 in accordance with some embodiments.

In some implementations, the mobile communication device 101 is a radio carried by a police officer or other emergency responder personnel and is used for in-the-field communication. As illustrated in FIG. 2, the mobile communication device 101 is configured to automatically monitor audio data and to provide suggestions or requests to a device user for supplemental questions to ask witnesses or other personnel. The mobile communication device 101 records audio data from a conversation (block 201) and searches data sources to verify statements observed in the audio data (block 203). For example, the mobile communication device 101 may identify a verifiable fact or condition in the recorded audio data. A verifiable fact is a portion (i.e. statement) of the recorded audio data that can be independently verified for factual accuracy. Based on the results of the search, the mobile communication device 101 may determine whether more information is required (i.e. follow-up questions should be asked) (block 205). When the search reveals useful information without the need for any supplemental information, the mobile communication device 101 will produce an output notification (i.e. display an output message on its display screen) or emit an equivalent audio, visual, or haptic output notification (block 207). However, when the results of the search suggest that more information is necessary in order to reach a conclusion, the mobile communication device 101 will generate a prompt (block 209) suggesting a specific question that the user should ask of the witness. For example, in some embodiments, the prompt is displayed as text on the display screen 107 while, in other embodiments, the prompt is output as audio through the speaker 105 or through an earpiece worn by the user (e.g., the audio prompt telling the user what questions to ask next). After the prompt is displayed (block 209), the mobile communication device 101 continues to monitor the audio stream for supplemental data (block 211) and performs a supplemental search when/if the suggested follow-up question is asked of the witness.

For example, if a witness at a crime scene states that "I suppose it was rainy when the incident happened because John had an umbrella," the mobile communication device 101 in some configurations may identify the "rainy" condition as a verifiable fact and respond by searching a weather news resource accessed through the wireless network connection to determine whether it was raining at the time of the incident. If the search determines that it was indeed raining at the time of the incident, the mobile communication device may generate a prompt by displaying a text message or outputting an audio message like "CONFIRMED: It was raining at the time of the incident."

However, if the search reveals that it was not raining at the time of the incident, the mobile communication device may prompt the user for more information to better assess the value of the detected witness statement. For example, if the search reveals that it was not raining at the time, it is possible that (1) John was carrying an umbrella even though there was no need for it, (2) John was carrying something, but it was not an umbrella, or (3) the witness observation is not correct. To further evaluate the statement, the mobile communication device 101 may display a message on the display screen prompting the user to ask a follow-up question. For example, the display screen might display the message as a prompt (e.g., "ALERT: Was not raining at the time of incident. Ask the witness if he is sure that the object was an umbrella") or may display a question to be asked of the witness (e.g., "Did you see John open the umbrella?"). If the user asks about the umbrella and the witness provides a different answer or additional information, the mobile communication device 101 may automatically perform a supplemental search based on the additional data to further evaluate the scenario.

Figure 3:
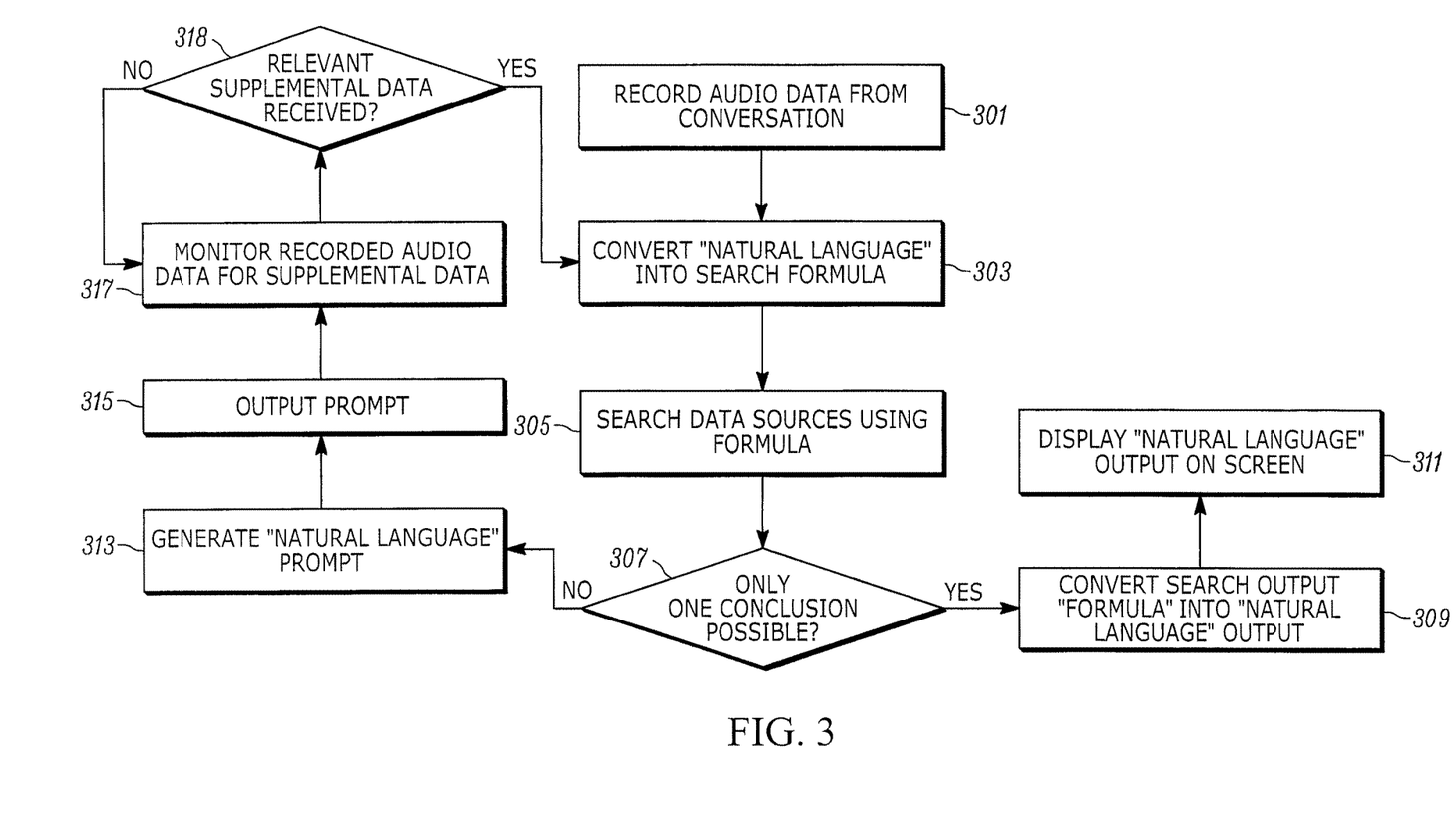
FIG. 3 is a flowchart of another method of performing automated real-time analysis of audio data to supplement questioning using the mobile communication device and communications network of FIG. 1 in accordance with some embodiments.

FIG. 3 illustrates a more detailed example of the operations performed by the mobile communication device 101 in analyzing and searching data based on a natural-language conversation. The mobile communication device 101 records audio data (block 301) and converts the natural language into a logical analysis format representation such as, for example, a "search formula" (block 303). The mobile communication device 101 performs a search of one or more data sources using the generated formula (block 305). When the results of the search confirm that only one conclusion is possible (block 307) (e.g., it was actually raining at the time of the incident and John was probably carrying an umbrella), the mobile communication device 101 converts the search results into a "natural language output" (block 309) and displays the natural language output on its display screen (block 311).

However, when the search results indicate that multiple conclusions are still possible (block 307), the mobile communication device 101 generates a "natural language prompt" based on the results of the search (block 313) and outputs the natural language prompt on the mobile communication device (e.g., by displaying the natural language text on the display screen) (block 315). The mobile communication device 101 then continues to monitor the audio input data for further relevant information in response to the prompted query (block 317). When relevant supplemental information is detected (e.g., when the mobile communication device confirms that the user asked the prompted question and the witness provides a response) (block 318), the system generates another search formula based on the supplemental information (block 303) and performs a supplemental search of one or more data sources (block 305). Otherwise, the system continues to monitor for supplemental data in the recorded audio data (block 317)

Various different forms of searching and analysis formulae may be used in different implementations of this system. For example, the mobile communication device 101 may implement a natural language processing algorithm that utilizes Modal Logics of Predicates (MLoP) and ontological search data to provide the user with proven/confirmed facts resolved from the detected conversational audio and real world information from the data sources.

Figure 4:
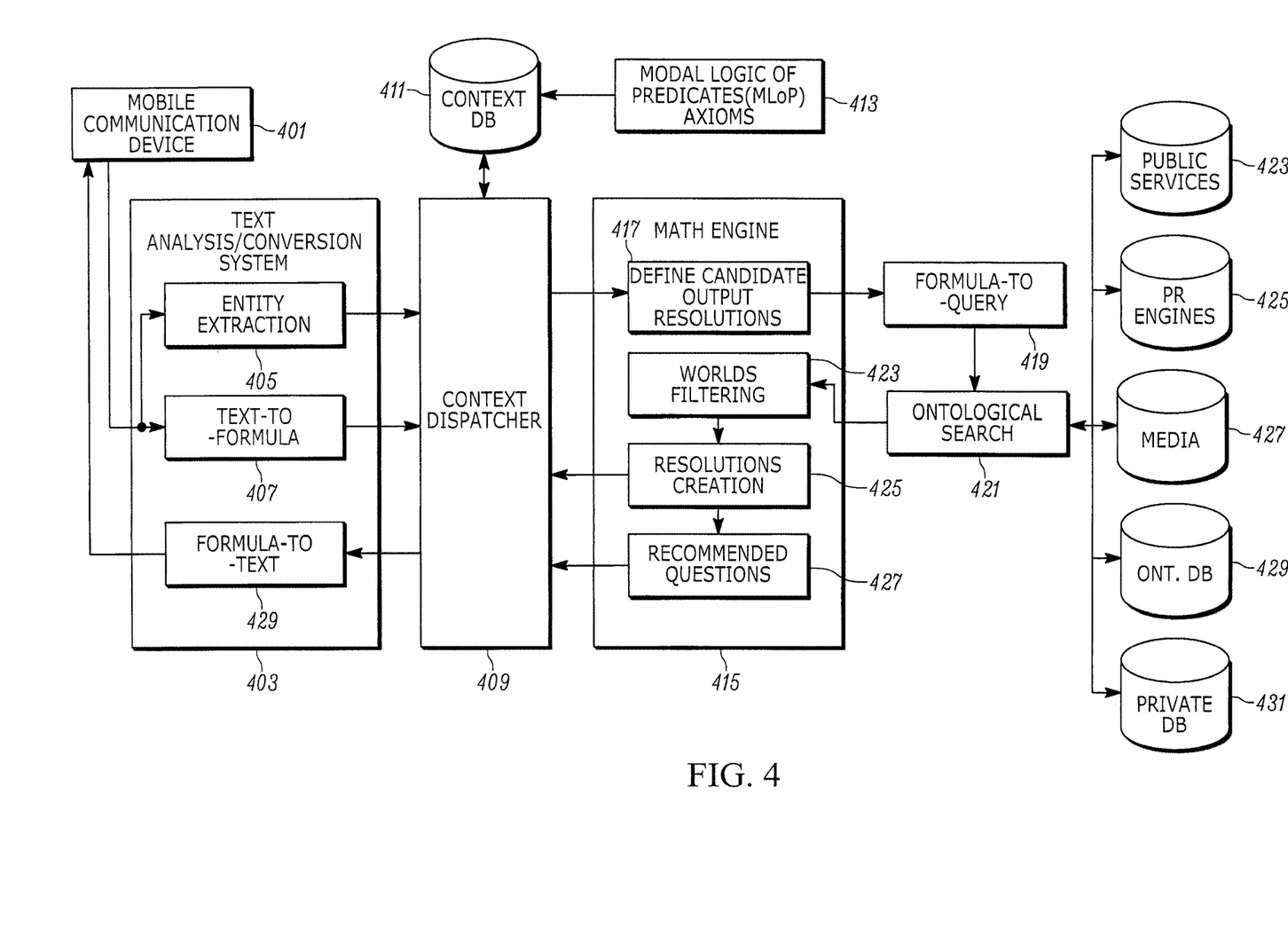
FIG. 4 is a functional block diagram of a method of performing automated real-time analysis of audio data to supplement questions by applying modal logics of predicates context and analysis techniques to search networked data sources based on audio data recorded by the mobile communication device of FIG. 1 in accordance with some embodiments.

FIG. 4 provides another example of a system that analyzes conversational natural-language speech and provides supplemental questioning assistance—this time specifically using Modal Logics of Predicates (MLoP) analysis. In this example, a natural-language audio stream of the user's conversation with a witness or other person is captured by a mobile communication device 401 and wirelessly transmitted to a text analysis/conversion system 403 operating on a remote server (e.g., a natural language conversion server 115 such as illustrated in FIG. 1). The system receives the natural speech audio from the mobile communication device 401, analyzes the data to identify/extract "entities" (e.g., people or objects) mentioned in the audio stream (block 405), and converts the natural language audio stream into a logical analysis format representation based on a Modal Language of Predicates (MLoP) formula (block 407). A context dispatcher 409 is coupled to a context database 411 and identifies an appropriate context for the audio stream sentence. The context database 411 stores a plurality of formula "contexts" that are defined according to Modal Logic of Predicates (MLoP) axioms 413 and that are used by the context dispatcher 409 to identify an appropriate formula format/context for the audio stream sentence and to convert the audio sentence data into an appropriate formula (block 407). A math engine 415 performs a Modal Logic of Predicates (MLoP) calculus based on existent formulas in order to define candidate output resolutions (e.g., possible conclusions) (in the form of a Modal Logics of Predicates formula) (block 417). A search query is generated based on the one or more formulas (block 419) and an ontological search is performed (block 421) on one or more connected data sources to confirm whether each of the potential conclusions can be confirmed or dismissed.

In various different implementations, the natural language conversion server may be configured to access a variety of different servers in order to perform its search. For example, as illustrated in the example of FIG. 4, the system may search one or more public services 423 (such as government data, weather information, etc.), press release ("PR") Engines 425, media sources 427 (e.g., news outlets), ontological databases 429, and other private databases 431.

After the searches are performed, the system determines which candidate output resolutions (e.g., "possible worlds") are still possible and filters out those candidate output resolutions (e.g., "worlds") that would contradict the results of the search (block 423). If only one candidate output resolution remains confirmed by the results of the search, the math engine 415 provides this formula as the result of the analysis (block 425). However, if multiple different conclusions are still possible, the math engine generates a "formula-to-check" (i.e., a recommended follow-up question presented in a formula format) that would best differentiate between the remaining possible conclusions (block 427).

Whether the output of the math engine analysis is a confirmed resolution (block 425) or a recommended follow-up question (block 427), the math engine 415 returns the output formula to the context dispatcher 409. The text analysis/conversion system 403 converts the output formula to a natural-language sentence and transmits the text sentence to the mobile communication device 401 where it is displayed to the user.

The system and method that is schematically illustrated in FIG. 4 can also be explained with reference to the following scenario. The mobile communication device 401 monitors the conversation between a police officer and a witness and detects the witness's statement that "I suppose that it was rainy when the incident happened because John had an umbrella." The audio data is sent to the text analysis/conversion system 403 where the words "John" and "umbrella" are extracted as entities (block 405). The context dispatcher 411 identifies the formula $m_1(m_2(p_1(e_1, e_2), m_3(p_2( ))))$ as the best formula from the context database 411 for the received audio sentence and converts the audio data into the formula such that $m_1$ is the modality of concern, $m_2$ is the modality of reason, $p_1$ is an ownership predicate ($e_1$ is John and $e_2$ is his umbrella), $m_3$ is the modality of time, and $p_2$ is the rain predicate. The predicate of whether it was raining ($p_2$) is tied to the modality of time (i.e., the time of the incident) $m_3$ while the predicate of ownership ($p_1$) suggests that John ($e_1$) has an umbrella ($e_2$). Therefore, according to the formula, the modality of concern (i.e., the question to be confirmed) suggests that the system can confirm whether it is plausible that John had an umbrella (i.e., the predicate of ownership) if it can be confirmed that it was raining at the time of the incident (i.e., the modality of time). Based on this formulaic representation, the system develops and performs a search to confirm whether it was raining at the time of the incident.

If the search confirms that it was indeed raining at the time, the system generates a resolution (block 425) confirming that the witness's statement is plausible. However, if the search confirms that it was not raining at the time, the math engine 415 cannot provide a logical proof of the witness statement as represented in the formula above. Instead, the system defines two possible "worlds" that would make the witness statement plausible: (1) the witness was mistaken—John was carrying an object, but it was not an umbrella, or (2) the witness is lying—John was not carrying anything.

The math engine 415 then generates a formula that would best differentiate between these two candidate output resolutions. For example, the output recommended questions might be defined according to the formula $m_4(p3(e_1,e_2))$, where $p_3$ is a predicate of opening the umbrella and $m_4$ is a confirmation modality. When converted from the formula into a natural language sentence (block 429), the recommended questions might be output as "Did you see John opening the umbrella?" (i.e., "Did you see" is the confirmation modality ($m_4$), "opening" is the predicate of opening ($p_3$), and John & the umbrella are the entities ($e_1$ & $e_2$)). The natural-language text sentence is transmitted to the mobile communication device 401 and displayed on the display screen.

In additional to providing one or more recommended questions, the system illustrated in FIG. 4 may be configured to detect an answer to the question in the audio stream data and use the detected answer to further analyze the query. However, in this case, the response from the witness may resolve the formulaic question. Returning again to the example of John and the umbrella, it the recommended questions was a formulaic representation of the question "Did you see John open the umbrella?" and the witness's answer was "Yes, I saw John open the umbrella." The system can resolve the two remaining "possible worlds" by concluding that the witness is likely lying—the system has already confirmed through the prior search that it was not raining at the time of the incident and, therefore, John would have no reason to open the umbrella. Without performing an additional search query, the system can generate an output message to be displayed on the display screen of the mobile communication device stating "CAUTION: Witness is likely lying."

Conversely, if the witness's answer is "No, I did not see John open the umbrella," the system can resolve the two remaining "possible worlds" by concluding that the object that John was carrying was probably not an umbrella. As such, the system would generate an output message to be displayed on the display screen of the mobile communication device stating "Object was likely not an umbrella."

Furthermore, in some implementations, the audio stream data captured by the mobile communication device 401 may be stored for future access and review. In such implementations, the performed searches, recommended questions, and any resolved conclusions can be stored with a time stamp to annotate or supplement the stored record of the conversation. As such, when the stored audio stream is played back, the user will also be alerted to any resolutions confirmed or refuted by the natural language analysis system in real-time during the review of the audio recording.

The Modal Logics of Predicates (MLoP) formulas stored in the context database 411 include entities (i.e., persons or objects), predicates that describe relations between entities, and modalities that describe relations between entities and real world information. In addition to storing a plurality of formulas, the context database also stores a natural language template that is described and characterized by a corresponding formula. To identify the appropriate formula, the system analyzes the incoming natural language sentence and first identifies entities, then predicates, and finally modalities in the natural language sentence. Based on the structure and ordering of the identified entities, predicates, and modalities in the natural language sentences, the system identifies a natural language sentence template that corresponds to the incoming natural language sentence. Once an appropriate template is identified for the incoming natural language sentence, the corresponding formula is used to convert the natural language sentence into a formulaic representation.

Sentence templates are developed based on known linguistic sentence structure. However, in conversation, it is possible that a spoken sentence may be linguistically informal or may be incomplete. In such circumstances, a template and formula might still be identified, but the formula cannot be fully populated because some necessary data is missing from the sentence. In some implementations, the system is further configured to identify when an identified sentence template for a natural language sentence is incomplete and may prompt the user to ask one or more additional questions to obtain the information necessary to fill the template.

Conversely, templates and associated formulas are also used to convert output formulas generated by the math engine 415 into natural language sentences that can be displayed on the display screen of the mobile communication device. When an output formula is generated, the context dispatcher 409 identifies the corresponding natural language sentence template and fills the template with words from the formulaic representation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for analyzing conversational statements and providing feedback in real-time, the method comprising:
  receiving, by a natural-language electronic processing device, audio stream data including a natural-language statement recorded by a communication device;
  converting, by a natural-language electronic processing device, the natural-language statement into a logical analysis format representation;
  performing, by a natural-language electronic processing device, an automatic logical analysis on the logical analysis format representation of the natural-language statement to identify one or more candidate output resolutions and identify supplemental data that can confirm the one or more candidate output resolutions, wherein each candidate output resolution of the one or more candidate output resolutions relates to an assessment of a factual accuracy of the natural-language statement, wherein performing the automatic logical analysis on the logical analysis format representation of the natural-language statement includes identifying a verifiable fact that can confirm whether the natural-language statement is inconsistent and unreliable, wherein the identified verifiable fact that can confirm whether the natural-language statement is inconsistent and unreliable includes an indication of a weather condition at a specific time and a specific location;

accessing, by a natural-language electronic processing device, the identified supplemental data and evaluating the one or more candidate output resolutions based at least in part on the supplemental data; and generating, by a natural-language electronic processing device, a feedback message to be output by the communication device, the feedback message being indicative of the evaluation of the one or more candidate output resolutions.

2. A method for analyzing conversational statements and providing feedback in real-time, the method comprising:

receiving, by a natural-language electronic processing device, audio stream data including a natural-language statement recorded by a communication device;

converting, by a natural-language electronic processing device, the natural-language statement into a logical analysis format representation;

performing, by a natural-language electronic processing device, an automatic logical analysis on the logical analysis format representation of the natural-language statement to identify one or more candidate output resolutions and identify supplemental data that can confirm the one or more candidate output resolutions, wherein each candidate output resolution of the one or more candidate output resolutions relates to an assessment of a factual accuracy of the natural-language statement;

accessing, by a natural-language electronic processing device, the identified supplemental data and evaluating the one or more candidate output resolutions based at least in part on the supplemental data;

eliminating at least one of the one or more candidate output resolutions based at least in part on the supplemental data;

identifying a plurality of candidate output resolutions that are not eliminated after evaluating the one or more possible output resolutions based at least in part on the supplemental data;

generating a formula identifying a criteria that will differentiate between the plurality of candidate output resolutions that are not eliminated;

generating, by a natural-language electronic processing device, a feedback message to be output by the communication device, the feedback message being indicative of the evaluation of the one or more candidate output resolutions, by converting the generated formula into a natural-language feedback message;

transmitting the natural-language feedback message as a recommended follow-up question to be displayed on the communication device;

monitoring the received audio stream data for a second natural-language statement responding to the natural-language feedback message; and further evaluating the plurality of candidate output resolutions based on the second natural-language statement.

3. The method of claim 2, wherein performing the automatic logical analysis on the logical analysis format representation of the natural-language statement includes identifying a verifiable fact that can confirm whether the natural-language statement is inconsistent and unreliable.

4. The method of claim 3, wherein accessing the identified supplemental data includes searching one or more networked data sources for the identified verifiable fact, and wherein evaluating the one or more possible output resolutions based at least in part on the supplemental data includes evaluating whether the natural-language statement is unreliable based on search results for the identified verifiable fact.

5. The method of claim 4, wherein generating the feedback message to be displayed on the communication device indicative of the evaluation of the one or more candidate output resolutions includes transmitting a message to the communication device alerting of found inconsistencies in the natural-language statement.

6. The method of claim 4, wherein searching one or more networked data sources for the identified verifiable fact includes automatically performing an Internet search based on the logical analysis format representation of the natural-language statement.

7. The method of claim 2, wherein converting the natural-language statement into the logical analysis format representation includes generating a formula representation of the natural-language statement according to modal logics of predicates.

8. The method of claim 2, wherein converting the natural-language statement into the logical analysis format representation includes:

identifying a natural-language sentence template stored on a non-transitory computer-readable memory that corresponds to the natural-language;

accessing a formula from the non-transitory computer-readable memory corresponding to the identified natural-language sentence template; and populating the accessed formula with words from the natural-language statement according to the identified natural-language sentence template.

9. The method of claim 8, wherein performing the automatic logical analysis on the logical analysis format representation of the natural-language statement to identify supplemental data that can confirm the one or more candidate output resolutions includes identifying a verifiable condition from the populated formula generated for the natural-language statement.

10. The method of claim 9, wherein accessing the identified supplemental data includes generating a search query for the identified verifiable condition, and performing a search of one or more networked data sources based on the generated search query.

11. A mobile communications system comprising:

a communication device configured to capture audio including one or more natural-language statements; and a natural-language conversion server communicatively coupled to at least one mobile communication device and configured to convert a natural-language statement, of the one or more natural-language statements received by the communication device, into a logical analysis format representation, perform an automatic logical analysis on the logical analysis format representation of the natural-language statement to identify one or more candidate output resolutions, wherein each candidate output resolution of the one or more candidate output resolutions relates to an assessment of a factual accuracy of the natural-language statement, accessing supplemental data and evaluating the one or more candidate output resolutions based at least in part on the supplemental data, identify a plurality of candidate output resolutions that are not eliminated after evaluating the one or more candidate output resolutions based at least in part on the supplemental data, generate a formula identifying a criteria that will differentiate between the plurality of candidate output resolutions that are not eliminated, generate a feedback message to be output on the mobile communication device indicative of the evaluation of the one or more candidate output resolution by converting the generated formula into a natural-language feedback message, transmit the natural-language feedback message as a recommended follow-up question to be displayed on the mobile communication device, monitor the received audio stream data for a second natural-language statement responding to the natural-language feedback message, and further evaluate the plurality of candidate output resolutions based on the second natural-language statement.

12. The mobile communications system of claim 11, wherein the natural-language conversion server is configured to perform the automatic logical analysis on the logical analysis format representation of the natural-language statement by identifying a verifiable fact that can confirm whether the natural-language statement is inconsistent and unreliable.

13. The mobile communications system of claim 12, wherein the natural-language conversion server is configured to access the supplemental data by searching one or more networked data sources for the identified verifiable fact, and is configured to evaluate the one or more candidate output resolutions based at least in part on the supplemental data by evaluating whether the natural-language statement is unreliable based on search results for the identified verifiable fact.

14. The mobile communications system of claim 13, wherein the natural-language conversion server is further configured to transmit the feedback message to the mobile communication device alerting of found inconsistencies in the natural-language statement.

15. The mobile communications system of claim 13, wherein the natural-language conversion server is configured to search one or more networked data sources for the identified verifiable fact by automatically performing an Internet search based on the logical analysis format representation of the natural-language statement.

16. The mobile communications system of claim 11, wherein the natural-language conversion server is configured to convert the natural-language statement into the logical analysis format representation by:

identifying a natural-language sentence template stored on a non-transitory computer-readable memory that corresponds to the natural-language;

accessing a formula from the non-transitory computer-readable memory corresponding to the identified natural-language sentence template; and populating the accessed formula with words from the natural-language statement according to the identified natural-language sentence template.

17. The mobile communications system of claim 16, wherein the natural-language conversion server is configured to perform the automatic logical analysis on the logical analysis format representation of the natural-language statement to identify supplemental data that can confirm the one or more possible output resolutions by identifying a verifiable condition from the populated formula generated for the natural-language statement.

18. The mobile communications system of claim 17, wherein the natural-language conversion server is configured to access the supplemental data by generating a search query for the identified verifiable condition, and performing a search of one or more networked data sources based on the generated search query.

* * * * *